United States Patent
Ohkoshi et al.

(10) Patent No.: US 7,550,176 B2
(45) Date of Patent: Jun. 23, 2009

(54) METHOD OF FORMING COATING FILM ON ALUMINUM SUBSTRATE

(75) Inventors: Toshio Ohkoshi, Aichi (JP); Hiroki Takeda, Aichi (JP); Yoshinori Kato, Aichi (JP); Masahiro Nakamura, Toyota (JP); Masayoshi Harada, Osaka (JP); Manabu Imose, Osaka (JP)

(73) Assignees: Kansai Paint Co., Ltd., Amagasaki-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 763 days.

(21) Appl. No.: 10/539,120

(22) PCT Filed: Dec. 19, 2003

(86) PCT No.: PCT/JP03/16302

§ 371 (c)(1),
(2), (4) Date: Jun. 16, 2005

(87) PCT Pub. No.: WO2004/056497

PCT Pub. Date: Jul. 8, 2004

(65) Prior Publication Data

US 2006/0062908 A1    Mar. 23, 2006

(30) Foreign Application Priority Data

Dec. 20, 2002   (JP)   ............... 2002-369599

(51) Int. Cl.
*B05D 1/12* (2006.01)
*B05D 1/36* (2006.01)

(52) U.S. Cl. .......... 427/180; 427/372.2; 427/379; 427/385.5; 427/388.1; 427/388.2; 427/402; 427/407.1; 427/409

(58) Field of Classification Search ........ 427/180, 427/372.2, 379, 385.5, 386, 388.1, 388.2, 427/402, 407.1, 409
See application file for complete search history.

(56) References Cited

U.S. PATENT DOCUMENTS 4,801,680 A * 1/1989 Geary et al. ............ 528/272
5,212,245 A * 5/1993 Franks et al. ........... 525/223

FOREIGN PATENT DOCUMENTS

| JP | 51-022734 | 2/1976 |
|----|-----------|--------|
| JP | 51-22734 | 2/1976 |
| JP | 60-118267 | 6/1985 |
| JP | 62-097675 | 5/1987 |
| JP | 62-97675 | 5/1987 |
| JP | 63-137773 | 6/1988 |
| JP | 2-152578 | 6/1990 |
| JP | 02-152578 | 6/1990 |
| JP | 6-346007 | 12/1994 |
| JP | 06-346007 | 12/1994 |
| JP | 8-10686 | 1/1996 |
| JP | 08-010686 | 1/1996 |
| JP | 11-300271 | 11/1999 |
| JP | 2000-176373 | 6/2000 |
| JP | 2001062391 A * | 3/2001 |
| JP | 2002-80791 | 3/2002 |
| JP | 2002-080791 | 3/2002 |
| JP | 2003-154310 | 5/2003 |

OTHER PUBLICATIONS

International Search Report dated Mar. 9, 2004.

* cited by examiner

*Primary Examiner*—Elena T Lightfoot
(74) *Attorney, Agent, or Firm*—Kratz, Quintos & Hanson, LLP

(57) ABSTRACT

The present invention provides a method of forming a coating film on an aluminum substrate, comprising the steps of: (1) coating an aluminum substrate with a thermosetting polyester resin lustrous powder base coating composition (a) containing a lustrous material, and baking the resulting base coat layer; and (2) coating the base coat layer with a thermosetting acrylic resin clear powder coating composition (b), and baking the resulting clear coat layer to obtain a lustrous multilayer coating film.

8 Claims, No Drawings

US 7,550,176 B2

METHOD OF FORMING COATING FILM ON ALUMINUM SUBSTRATE

TECHNICAL FIELD

The present invention relates to a method of forming a lustrous multilayer coating film on an aluminum substrate.

BACKGROUND ART

Steel wheels, aluminum wheels, and the like are used as motor vehicle wheels, to which tubes, tires, etc., are fitted. In particular, aluminum wheels are widely used since they have excellent properties in terms of light weight, anticorrosion, design, etc.

A multilayer coating film is usually formed on an aluminum substrate such as an aluminum wheel for the sake of protection and appearance. The formation of a multilayer coating film is conducted by, for example, a method of optionally coating the aluminum substrate with a primer, and then coating the substrate with a thermosetting, organic solvent-based, colored base coating composition, and thereafter with a thermosetting acrylic resin, organic solvent-based, clear coating composition.

Such a method of forming a multilayer coating film is problematic in that organic solvents of organic solvent-based coating compositions used in the method have harmful effects on the global environment.

Japanese Unexamined Patent Publication No. 1999-300271 discloses a method of forming a multilayer coating film using a powder coating composition that does not contain any organic solvent. In this method, a multilayer coating film is formed by coating a metal substrate with an epoxy resin powder coating composition, optionally followed by heating, and then coating the coated substrate with a powder coating composition such as a thermosetting acrylic resin powder coating composition, followed by heating. However, an improvement in the interlayer adhesion of the multilayer coating film is desired in this method. Furthermore, this method was not intended to provide a lustrous coating film.

DISCLOSURE OF THE INVENTION

An object of the present invention is to provide a method of forming a lustrous multilayer coating film on an aluminum substrate, wherein the multilayer coating film has excellent properties in terms of interlayer adhesion, corrosion resistance, weatherability, etc., and the method does not discharge any organic solvent.

To achieve the above object, the present inventors carried out extensive research. As a result, the inventors found that when an aluminum substrate is coated with a thermosetting polyester resin lustrous powder base coating composition (a) containing a lustrous material, followed by baking, and then coated with a thermosetting acrylic resin clear powder coating composition (b), followed by baking, a lustrous multilayer coating film is obtained without the discharge of any organic solvent, and that the multilayer coating film has excellent properties in terms of interlayer adhesion, corrosion resistance, weatherability, etc. Based on such findings, the inventors accomplished the present invention.

The present invention provides a method of forming a multilayer coating film as follows.

1. A method of forming a coating film on an aluminum substrate, comprising the steps of:
   (1) coating an aluminum substrate with a thermosetting polyester resin lustrous powder base coating composition (a) containing a lustrous material, and baking the resulting base coat layer; and
   (2) coating the base coat layer with a thermosetting acrylic resin clear powder coating composition (b), and baking the resulting clear coat layer to obtain a lustrous multilayer coating film.

2. A method of forming a coating film according to item 1, wherein the lustrous material in the lustrous powder base coating composition (a) is at least one member selected from the group consisting of resin-coated aluminum flakes, colored aluminum flakes, mica, titanium metal flakes, alumina flakes, silica flakes, graphite, stainless steel flakes, platy iron oxide, and micaceous iron oxide.

3. A method of forming a coating film according to item 1, wherein the lustrous powder base coating composition (a) comprises a carboxyl-containing polyester resin as a base resin, and a β-hydroxyalkylamide as a crosslinking agent.

4. A method of forming a coating film according to item 3, wherein the polyester resin is a polyester polycarboxylic acid resin having an acid value of about 10 to about 100 KOH mg/g of resin.

5. A method of forming a coating film according to item 3, wherein the polyester resin is a polyester polycarboxylic acid resin having a weight average molecular weight of about 500 to about 50,000.

6. A method of forming a coating film according to item 3, wherein the polyester resin is a polyester polycarboxylic acid resin having a softening temperature of about 50° C. to about 140° C.

7. A method of forming a coating film according to item 3, wherein the ratio of β-hydroxyalkylamide to carboxyl-containing polyester resin is such that the number of β-hydroxyalkylamide hydroxyl groups is about 1.2 to about 1.6 per polyester resin carboxyl group.

8. A method of forming a coating film according to item 1, wherein the clear powder coating composition (b) comprises an epoxy-containing acrylic resin as a base resin, and a polycarboxylic acid and/or anhydride thereof as a crosslinking agent.

9. A method of forming a coating film according to item 8, wherein the epoxy-containing acrylic resin has an epoxy equivalent of about 200 to about 800.

10. A method of forming a coating film according to item 8, wherein the epoxy-containing acrylic resin has a weight average molecular weight of about 1,000 to about 10,000.

11. A method of forming a coating film according to item 8, wherein the epoxy-containing acrylic resin has a softening temperature of about 50° C. to about 140° C.

12. A method of forming a coating film according to item 8, wherein the ratio of polycarboxylic acid and/or anhydride thereof to epoxy-containing acrylic resin is such that the total number of carboxyl groups and anhydride groups thereof in the polycarboxylic acid and/or anhydride thereof is about 0.6 to about 0.9 per acrylic resin epoxy group.

In this specification, "average particle diameter" means the particle diameter ($D_{50}$) obtained by measuring the particle diameter distribution of a coating composition powder, lustrous material, pigment, etc., and taking the value at which cumulative distribution percentage reaches 50% from the smaller particle diameter side. Particle diameter distribution can be measured based oh the principle that the intensity pattern of diffraction or dispersion produced by applying light to particles depends on the size of the particles. Ordinary particle diameter distribution meters may be used to measure the particle diameter distribution. Particle diameter distribution meters are commercially available, and specific examples thereof are "Microtrac 9220 FRA" (trade name, product of Nikkiso Co., Ltd.), "Microtrac HRA" (trade name, product of Nikkiso Co., Ltd.), "COULTER MULTISIZER" (trade name, product of Beckman Coulter, Inc.), etc.

The method of forming a multilayer coating film according to the present invention is described below in greater detail.

Aluminum Substrate

Aluminum substrates to be coated according to the method of the present invention are, for example, aluminum wheels, which are fitted with tubes, tires, etc., for motor vehicles such as cars, motorcycles, trucks, vans, etc.

Aluminum substrates are usually composed of an alloy of aluminum (main component) with magnesium, silicon, etc.

Aluminum substrates may be molded into any form for purposes of light weight, better design, etc. Furthermore, an aluminum substrate may have one or more of uneven casting surfaces obtained by shot blasting, smooth surfaces obtained by cutting, etc.

Before an aluminum substrate is used in the coating film formation method of the present invention, the surface thereof is preferably subjected to chemical conversion treatment using a chromate or a phosphate. If necessary, aluminum substrates may be coated with a primer.

The following is a description of the components of thermosetting polyester resin lustrous powder base coating composition (a) containing a lustrous material, and thermosetting acrylic resin clear powder coating composition (b), which are used in the coating film formation method of the present invention.

Thermosetting Polyester Resin Lustrous Powder Base Coating Composition (a) Containing a Lustrous Material The lustrous base coating composition (a) is preferably a powder coating composition comprising a carboxyl-containing polyester resin as a base resin, and a β-hydroxyalkylamide as a crosslinking agent, and further comprising a lustrous material.

A suitable example of the polyester resin is polyester polycarboxylic acid resin.

The acid value of the polyester polycarboxylic acid resin is preferably about 10 to about 100 KOH mg/g of resin, and more preferably about 20 to about 80 KOH mg/g of resin. The weight average molecular weight thereof is preferably about 500 to about 50,000, and more preferably about 1,000 to about 10,000. The softening temperature thereof is preferably about 50° C. to about 140° C., and more preferably about 60° C. to about 120° C.

If the acid value is less than 10 KOH mg/g of resin, the curability of the coating composition is low, and the resulting coating film has poor properties in terms of corrosion resistance, weatherability, etc. If the acid value is more than 100 KOH mg/g of resin, the water resistance, weatherability, etc., of the coating film are impaired. Thus, an acid value outside the specified range is undesirable. If the weight average molecular weight is less than 500, the resulting coating film has poor properties in terms of water resistance, workability, etc. If the weight average molecular weight is more than 50,000, the surface smoothness of the coating film is impaired. Thus, a weight average molecular weight outside the specified range is undesirable. If the softening temperature is lower than 50° C., the blocking resistance of the coating composition is impaired. If the softening temperature is higher than 140° C., the coating film has poor surface smoothness. Thus, a softening temperature outside the specified range is undesirable.

A polyester polycarboxylic acid resin may be obtained by suitably reacting a polybasic acid with a polyhydric alcohol such that the acid value of the resin is within the above-mentioned range.

Examples of suitable polybasic acids include aromatic and alicyclic dicarboxylic acid compounds such as phthalic acid, phthalic anhydride, isophthalic acid, terephthalic acid, dimethyl isophthalate, dimethyl terephthalate, hexahydrophthalic acid, hexahydrophthalic anhydride, tetrahydrophthalic acid, tetrahydrophthalic anhydride, etc. Other polycarboxylic acid compounds such as adipic acid, sebacic acid, maleic acid, maleic anhydride, trimellitic acid, trimellitic anhydride, etc., may be optionally used in combination with these dicarboxylic acid compounds.

Examples of suitable polyhydric alcohols include dihydric alcohols such as ethylene glycol, polyethylene glycol, propylene glycol, polypropylene glycol, butylene glycol, neopentyl glycol, 1,6-hexanediol, etc. Trihydric or higher alcohols such as trimethylolethane, trimethylolpropane, glycerin, pentaerythritol, etc., may be optionally used in combination with these dihydric alcohols.

An example of a β-hydroxyalkylamide as a crosslinking agent for the carboxyl-containing polyester resin is β-hydroxyethyl adipamide.

The ratio of β-hydroxyalkylamide to carboxyl-containing polyester resin is preferably such that the number of hydroxyl groups in the β-hydroxyalkylamide is within the range of about 1.2 to about 1.6 per carboxyl group in the polyester resin. A ratio outside this range is undesirable because it may cause poor interlayer adhesion between the base coat and the clear coat thereover, resulting in peeling between the two coat layers.

Thermosetting polyester resin lustrous powder base coating composition (a) preferably contains, as a lustrous material, at least one member selected from the group consisting of resin-coated aluminum flakes, colored aluminum flakes, mica, titanium metal flakes, alumina flakes, silica flakes, graphite, stainless steel flakes, plate-like iron oxide, and micaceous iron oxide.

The average particle diameter of the lustrous material is preferably in the range of about 2 to about 100 μm, and more preferably about 3 to about 80 μm.

The proportion of lustrous material in the base coating composition (a) is preferably about 1 to about 50 parts by weight, and more preferably about 2 to about 40 parts by weight, per 100 parts by weight of the total base resin and crosslinking agent solids content.

Furthermore, known coating additives other than the lustrous material may be incorporated into the lustrous powder base coating composition (a). Examples of such additives include pigments such as organic pigments, inorganic pigments, carbon pigments, and rust preventive pigments; curing catalysts; ultraviolet absorbers; ultraviolet stabilizers; antioxidants; surface modifiers; antifoaming agents; etc.

Examples of organic pigments include quinacridone pigments such as quinacridone, azo pigments such as pigment red, phthalocyanine pigments such as phthalocyanine blue, etc. Examples of inorganic pigments include titanium oxide, calcium carbonate, baryta, clay, talc, silica, etc. Examples of carbon pigments include carbon black, etc. Examples of rust preventive pigments include colcothar, strontium chromate, zinc phosphate, etc.

Examples of curing catalysts include dibutyltin diacetate, dibutyltin dilaurate, triethylamine, diethanolamine, etc. Examples of ultraviolet absorbers include benzophenone compounds, benzotriazole compounds, salicylate compounds, oxalic acid anilide compounds, etc. Examples of ultraviolet stabilizers include hindered amine compounds, etc. Examples of antioxidants include phenol compounds, organic sulfur compounds, phosphite compounds, etc.

The lustrous powder base coating composition (a) may be produced according to known methods. For example, a lustrous powder base coating composition (a) may be produced by the method of: dry-blending the components other than the lustrous material with a mixer; heating the resulting mixture to melt and knead it; subjecting it to cooling, coarse grinding, fine grinding, and filtration to give a powder resin mixture; and then incorporating a lustrous material into the powder resin mixture by a dry-blending or bonding method. In bonding methods, the lustrous material is bonded to a powder resin mixture by heat sealing or using an adhesive.

The average particle diameter of the lustrous powder base coating composition (a) is preferably in the range of about 10 to about 80 µm, and more preferably about 15 to about 60 µm.

Thermosetting Acrylic Resin Clear Powder Coating Composition (b)

The clear coating composition (b) is preferably a powder coating composition comprising an acrylic resin having epoxy group, which is a crosslinkable functional group, as a base resin, and a polycarboxylic acid and/or anhydride thereof as a crosslinking agent.

The epoxy equivalent of the epoxy-containing acrylic resin is preferably about 200 to about 800, and more preferably about 400 to about 600. The weight average molecular weight thereof is preferably about 1,000 to about 10,000, and more preferably about 2,000 to about 5,000. The softening temperature thereof is preferably about 50° C. to about 140° C., and more preferably about 60° C. to about 100° C.

If the epoxy equivalent is less than 200, the resulting coating film has poor properties in terms of surface smoothness, weatherability, etc. If the epoxy equivalent is more than 800, the curability of the coating composition is impaired, resulting in poor properties in terms of impact resistance, water resistance, weatherability, etc. Thus, an epoxy equivalent outside the specified range is undesirable. If the weight average molecular weight is less than 1,000, the resulting coating film has poor water resistance, weatherability, etc. If the weight average molecular weight is more than 10,000, the surface smoothness of the coating film is impaired. Thus, a weight average molecular weight outside the specified range is undesirable. If the softening temperature is lower than 50° C., the blocking resistance of the coating composition is impaired. If the softening temperature is higher than 140° C., the coating film has poor surface smoothness. Thus, a softening temperature outside the specified range is undesirable.

Examples of such acrylic resins are radical homopolymers of glycidyl-containing unsaturated monomers, radical copolymers of glycidyl-containing unsaturated monomers and other unsaturated monomers, etc.

Examples of glycidyl-containing unsaturated monomers include glycidyl acrylate, glycidyl methacrylate, methyl glycidyl acrylate, methyl glycidyl methacrylate, 3,4-epoxycyclohexyl methyl acrylate, 3,4-epoxycyclohexyl methyl methacrylate, etc.

Examples of other unsaturated monomers include acrylic/methacrylic alkyl/cycloalkyl esters such as methyl acrylate, methyl methacrylate, ethyl acrylate, ethyl methacrylate, iso-butyl acrylate, iso-butyl methacrylate, tert-butyl acrylate, tert-butyl methacrylate, 2-ethylhexyl acrylate, 2-ethylhexyl methacrylate, cyclohexyl acrylate, and cyclohexyl methacrylate; hydroxyl-containing unsaturated monomers such as hydroxyethyl acrylate, hydroxyethyl methacrylate, hydroxypropyl acrylate, and hydroxypropyl methacrylate; aromatic compounds such as styrene, vinyltoluene, and α-methylstyrene; nitrile compounds such as acrylonitrile and methacrylonitrile; etc.

The polycarboxylic acid and/or anhydride thereof used as a crosslinking agent for the epoxy-containing acrylic resin is a compound having at least two carboxyl groups per molecule and/or an anhydride thereof. Specifically, preferable examples of the polycarboxylic acid and/or anhydride thereof include aliphatic acids such as dodecanedioic acid, adipic acid, azelaic acid, sebacic acid, succinic acid, glutaric acid, pimelic acid, brassidic acid, itaconic acid, maleic acid, citraconic acid, eicosanedioic acid, etc; and anhydrides of these. These may be used singly or in combination of two or more.

The ratio of crosslinking agent to epoxy-containing acrylic resin is preferably such that the total number of carboxyl groups and anhydride groups thereof in the polycarboxylic acid and/or anhydride thereof is within the range of about 0.6 to about 0.9 per epoxy group in the acrylic resin. A ratio outside this range is undesirable because it may cause poor interlayer adhesion of the clear coat to the underlying lustrous base coat, resulting in peeling between the two coat layers.

Furthermore, various additives may be optionally incorporated into the clear powder coating composition (b). Examples of such additives include pigments such as organic pigments, inorganic pigments, and carbon pigments; curing catalysts; ultraviolet absorbers; ultraviolet stabilizers; antioxidants; surface modifiers; antifoaming agents; etc. If any pigment is incorporated, the amount thereof is preferably adjusted such that the transparency of the resulting coating film is not impaired.

Examples of additives that may be used in the clear powder coating composition (b) are similar to those mentioned in the above lustrous powder base coating composition (a).

The clear powder coating composition (b) may be produced according to known methods. For example, a clear powder coating composition (b) may be produced by the method of: dry-blending the above components with a mixer; heating the resulting mixture to melt and knead it; and subjecting it to cooling, coarse grinding, fine grinding, and filtration.

The average particle diameter of the clear powder coating composition (b) is preferably in the range of about 10 to about 80 µm, and more preferably about 15 to about 60 µm.

Steps for Forming Multilayer Coating Film

The coating film formation method of the present invention uses an aluminum substrate, which, if necessary, may be previously subjected to chemical conversion treatment and/or coated with a primer. The method comprises: coating such an aluminum substrate with a thermosetting polyester resin lustrous powder base coating composition (a), and baking the resulting base coat layer; and coating the base coat layer with a thermosetting acrylic resin clear powder coating composition (b), and baking the resulting clear coat layer. This method thus forms a lustrous multilayer coating film composed of a lustrous base coat layer and a clear coat layer.

The lustrous base coating composition (a) is preferably applied by electrostatic powder coating. Electrostatic powder coating may be performed according to known methods such as corona charging powder coating, triboelectric powder coating, etc. The base coating composition applied is baked at a temperature at which the thermosetting powder coating composition cures, i.e. usually at about 140° C. to about 220° C. for about 10 minutes to about 60 minutes.

The lustrous base coating film layer obtained after baking usually has a cured film thickness of about 10 to about 130 µm, and preferably about 30 to about 100 µm. If the cured film thickness is less than 10 μm, the lustrous properties of the coating film are impaired. Even if the cured film thickness is more than 130 μm, the performance of the coating film is not further improved.

A clear coating composition (b) is applied onto the obtained lustrous base coat layer, preferably using electrostatic powder coating. Electrostatic powder coating may be performed according to known methods such as corona charging powder coating, triboelectric powder coating, etc. The coating composition applied is baked usually at about 140° C. to about 220° C. for about 10 minutes to about 60 minutes.

The obtained clear coating film layer usually has a cured film thickness of about 30 to about 150 μm, and preferably about 50 to about 100 μm. If the cured film thickness is less than 30 μm, the lustrous properties of the coating film are impaired. Even if the cured film thickness is more than 150 μm, the performance of the coating film is not further improved.

The above-described method forms a lustrous multilayer coating film composed of a lustrous base coat layer and a clear coat layer on an aluminum substrate in an easy manner.

BEST MODE FOR CARRYING OUT THE INVENTION

The present invention is described below in further detail with reference to production examples, examples, and comparative examples. In these examples, parts are expressed on a weight basis.

PRODUCTION EXAMPLE 1

Preparation of Thermosetting Polyester Resin Lustrous Powder Base Coating Composition Polyester polycarboxylic acid resin (trade name: "CC7642", product of UCB, acid value: 35 KOH mg/g of resin, weight average molecular weight: 8,500, softening temperature: 110° C.) as a base resin, and β-hydroxyethyl adipamide (trade name: "XL-552", product of EMS, hydroxyl equivalent: 84) as a crosslinking agent were mixed in the amounts shown in Table 1, and dry-blended using a mixer. Each resulting mixture was heated to melt, kneaded, and subjected to cooling, coarse grinding, fine grinding, and sieve filtration, thus giving a powder resin mixture.

Seven parts of resin-coated aluminum flake (trade name: "PCF-7670A", product of Toyo Aluminum K.K.) as a lustrous material was dry-blended into each powder resin mixture, using a mixer, and the resulting mixtures were subjected to sieve filtration, thus giving thermosetting polyester resin lustrous powder base coating compositions (1A) to (1E). In all of these coating compositions, the average particle diameters were 30 μm.

Table 1 shows the components of the lustrous base coating compositions.

TABLE 1

|  | Lustrous powder base coating composition | | | | |
| --- | --- | --- | --- | --- | --- |
|  | 1A | 1B | 1C | 1D | 1E |
| Base resin (parts) | 94.0 | 93.0 | 92.3 | 94.5 | 92.0 |
| Crosslinking agent (parts) | 6.0 | 7.0 | 7.7 | 5.5 | 8.0 |
| Ratio of crosslinking agent to base resin | 1.2 | 1.4 | 1.6 | 1.1 | 1.7 |
| Lustrous material (parts) | 7.0 | 7.0 | 7.0 | 7.0 | 7.0 |

In Table 1, the ratio of crosslinking agent to base resin is expressed as the number of crosslinking agent hydroxyl groups per base resin carboxyl group.

PRODUCTION EXAMPLE 2

Preparation of Epoxy-Containing Acrylic Resin

Styrene (150 parts), butyl methacrylate (150 parts), methyl methacrylate (350 parts), glycidyl methacrylate (350 parts), xylene (1,000 parts), and azobisisobutyronitrile (20 parts) were reacted in a four-necked flask equipped with a stirrer, a reflux condenser, a nitrogen feed, and a dropping funnel, subjected to solvent removal and grinding, thus giving a solid acrylic resin. The obtained glycidyl-containing acrylic resin had a weight average molecular weight of 5,000, a softening temperature of 65° C., and an epoxy equivalent of 450.

PRODUCTION EXAMPLE 3

Preparation of Thermosetting Acrylic Resin Clear Powder Coating Composition

The epoxy-containing acrylic resin obtained in Production Example 2 as a base resin, and dodecanedioic acid as a curing agent were mixed in the amounts shown in Table 2, and dry-blended using a mixer. Each resulting mixture was heated to melt, kneaded, and subjected to cooling, coarse grinding, fine grinding, and sieve filtration, thus giving thermosetting acrylic resin clear coating compositions (2A) to (2E). In all of these coating compositions, the average particle diameters were 30 μm.

Table 2 shows the components of the clear coating compositions.

TABLE 2

|  | Clear powder coating composition | | | | |
| --- | --- | --- | --- | --- | --- |
|  | 2A | 2B | 2C | 2D | 2E |
| Base resin (parts) | 85.5 | 82.4 | 79.7 | 87.7 | 78.1 |
| Crosslinking agent (parts) | 14.5 | 17.6 | 20.3 | 12.3 | 21.9 |
| Ratio of crosslinking agent to base resin | 0.6 | 0.75 | 0.9 | 0.5 | 1.0 |

In Table 2, the ratio of crosslinking agent to base resin is expressed as the number of crosslinking agent carboxyl groups per base resin epoxy group.

EXAMPLE 1

A 10×70×150 mm cast aluminum plate (AC4C) subjected to chemical conversion treatment using chromate (trade name: "AL-1000", product of Nihon Parkerizing Co., Ltd.) was coated with thermosetting polyester resin lustrous powder base coating composition (1A) by corona charging powder coating such that the cured coating film thickness thereof after baking was 50 μm, and the resulting coat layer was then baked at 160° C. for 20 minutes. The coat layer was further coated with thermosetting acrylic resin clear powder coating composition (2A) by corona charging powder coating such that the cured coating film thickness thereof after baking was 80 μm, and the resulting coat layer was then baked at 160° C. for 20 minutes. A lustrous multilayer coating film was thus formed.

EXAMPLES 2 TO 5 AND COMPARATIVE EXAMPLES 1 TO 4

Lustrous multilayer coating films were formed as in Example 1 except that a thermosetting polyester resin lustrous powder base coating composition and a thermosetting acrylic resin clear powder coating composition were used in the combinations shown in Table 3.

The coated plates obtained in Examples 1 to 5 and Comparative Examples 1 to 4 were tested in terms of the following properties.

(1) Coating Surface Smoothness:

The coating films were checked with the naked eye to evaluate their surface smoothness. The criteria for evaluation were as follows:

A: The coating film had excellent surface smoothness.
B: The coating film had somewhat poor surface smoothness.
C: The coating film had poor surface smoothness.

(2) Interlayer Adhesion:

The coating films were given crosscuts with a cutter reaching down to the plate surface so as to form a grid of 100 squares (1 mm×1 mm). Adhesive tape was applied to the surface of the grid portion and forcefully pulled upward at 20° C. The peeling between the base coat layer and the clear coat layer was inspected, counting the number of remaining crosscut squares free from interlayer peeling. Interlayer adhesion was evaluated according to the following criteria:

A: The coating film had good interlayer adhesion, with 100 crosscut squares remaining.
B: The coating film had somewhat poor interlayer adhesion, with 99 to 70 crosscut squares remaining.
C: The coating film had poor interlayer adhesion, with not more than 69 crosscut squares remaining.

(3) Water Resistance

The coated plates were immersed in water at 40° C. for 240 hours. Immediately after the plates were taken out, the coating films were checked with the naked eye for defects such as blistering, dulling, etc. The water resistance of the coating films was evaluated according to the following criteria:

A: The coating film had no defects. It had excellent water resistance.
B: The coating film had a little blistering and dulling. It had somewhat poor water resistance.
C: The coating film had considerable blistering and dulling. It had poor water resistance.

After the coating films were then dried at room temperature for 1 hour, the interlayer adhesion thereof was evaluated as in the above interlayer adhesion test.

(4) Corrosion Resistance

The coating films were given crosswise cuts with a cutter reaching down to the plate surface, and were subjected to a salt spray test (JIS K5400-9.1) for 1,000 hours. The coating films were then washed with water and dried. Adhesive tape was applied to the crosscut portion and forcefully pulled upward at 20° C. to measure the width of peeling or blistering on one side of the crosscut portion. Corrosion resistance was evaluated according to the following criteria:

A: The coating film had excellent corrosion resistance, with the width of peeling or blistering being not more than 2 mm.
B: The coating film had somewhat poor corrosion resistance, with the width of peeling or blistering being more than 2 mm.
C: The coating film had poor corrosion resistance, with the width of peeling or blistering being 10 mm or more.

(5) Weatherability

The coated plates were subjected to a weathering test using a SWOM (standard weatherometer) (JIS K 5400-9.8.1) for 500 hours. Subsequently, the gloss of the coating films after the test was determined by the method according to JIS K 5600-4-7, based on the reflectance at an incidence angle of 60° and at an acceptance angle of 60°. The gloss retention with respect to initial gloss (before test) was calculated according to the following equation:

$$\text{Gloss retention (\%)} = [(\text{gloss after test})/(\text{initial gloss})] \times 100$$

The coated plates were then immersed in water at 40° C. for 120 hours. Immediately after the plates were taken out, the coating films were checked with the naked eye for defects such as blistering, etc. The weatherability of the coating films was evaluated according to the following criteria:

A: The coating film had no defects. It had excellent weatherability.
B: The coating film had a little blistering. It had somewhat poor weatherability.
C: The coating film had considerable blistering. It had poor weatherability.

After the coating films were then dried at room temperature for 1 hour, the interlayer adhesion thereof was evaluated as in the above interlayer adhesion test.

Table 3 shows the layers (coating compositions) and the performance test results of the multilayer coating films obtained in Examples 1 to 5 and Comparative Examples 1 to 4.

TABLE 3

|  | Ex. | | | | | Comp. Ex. | | | |
| --- | --- | --- | --- | --- | --- | --- | --- | --- | --- |
|  | 1 | 2 | 3 | 4 | 5 | 1 | 2 | 3 | 4 |
| Base coat layer | 1A | 1B | 1C | 1B | 1B | 1D | 1E | 1B | 1B |
| Clear coat layer | 2A | 2A | 2A | 2B | 2C | 2A | 2A | 2D | 2E |
| Surface smoothness | A | A | A | A | A | A | A | A | A |
| Interlayer adhesion | A | A | A | A | A | B | B | C | C |
| Water resistance-visual evaluation | A | A | A | A | A | C | C | C | C |
| Water resistance-interlayer adhesion | A | A | A | A | A | C | C | C | C |
| Corrosion resistance | A | A | A | A | A | B | A | C | A |
| Weatherability-gloss retention | 98 | 98 | 98 | 98 | 98 | 98 | 98 | 98 | 98 |
| Weatherability-visual evaluation | A | A | A | A | A | A | A | A | A |
| Weatherability-interlayer adhesion | A | A | A | A | A | C | C | C | C |

EFFECT OF THE INVENTION

The coating film formation method of the present invention provides remarkable effects as follows:

(1) The method forms a lustrous multilayer coating film on an aluminum substrate in an easy manner, the multilayer coating film having excellent properties in terms of interlayer adhesion, corrosion resistance, weatherability, etc.

(2) The method forms a thick-looking coating film particular to powder coating compositions, thus providing a unique coating film appearance, which is different from that obtained by the use of solvent-based coating compositions.

(3) Although the method forms a multilayer coating film, it does not discharge any organic solvent; therefore, it is a pollution-free method for forming a coating film.

The invention claimed is:

1. A method of forming a coating film on an aluminum substrate, comprising the steps of:
   (1) coating an aluminum substrate with a thermosetting polyester resin lustrous powder base coating composition (a) containing a lustrous material, and baking the resulting base coat layer; and
   (2) coating the base coat layer with a thermosetting acrylic resin clear powder coating composition (b), and baking the resulting clear coat layer to obtain a lustrous multilayer coating film;
   the lustrous powder base coating composition (a) comprising a carboxyl-containing polyester resin as a base resin, and a β-hydroxyalkylamide as a crosslinking agent:
   the clear powder coating composition (b) comprising an epoxy-containing acrylic resin as a base resin, and a polycarboxylic acid and/or anhydride thereof as a crosslinking agent;
   the ratio of the β-hydroxyalkylamide to the carboxyl-containing polyester resin being such that the number of β-hydroxyalkylamide hydroxyl groups is about 1.2 to about 1.6 per polyester resin carboxyl group; and
   the ratio of the polycarboxylic acid and/or anhydride thereof to the epoxy-containing acrylic resin being such that the total number of carboxyl groups and anhydride groups thereof in the polycarboxylic acid and/or anhydride thereof is about 0.6 to about 0.9 per acrylic resin epoxy group.

2. A method of forming a coating film according to claim 1, wherein the lustrous material in the lustrous powder base coating composition (a) is at least one member selected from the group consisting of resin-coated aluminum flakes, colored aluminum flakes, mica, titanium metal flakes, alumina flakes, silica flakes, graphite, stainless steel flakes, platy iron oxide, and micaceous iron oxide.

3. A method of forming a coating film according to claim 1, wherein the polyester resin is a polyester polycarboxylic acid resin having an acid value of about 10 to about 100 KOH mg/g of resin.

4. A method of forming a coating film according to claim 1, wherein the polyester resin is a polyester polycarboxylic acid resin having a weight average molecular weight of about 500 to about 50,000.

5. A method of forming a coating film according to claim 1, wherein the polyester resin is a polyester polycarboxylic acid resin having a softening temperature of about 50° C. to about 140° C.

6. A method of forming a coating film according to claim 1, wherein the epoxy-containing acrylic resin has an epoxy equivalent of about 200 to about 800.

7. A method of forming a coating film according to claim 1, wherein the epoxy-containing acrylic resin has a weight average molecular weight of about 1,000 to about 10,000.

8. A method of forming a coating film according to claim 1, wherein the epoxy-containing acrylic resin has a softening temperature of about 50° C. to about 140° C.

* * * * *